United States Patent
Amsterdam et al.

(10) Patent No.: US 10,601,884 B2
(45) Date of Patent: *Mar. 24, 2020

(54) SWITCHING MEDIA STREAMS IN A CLIENT

(71) Applicant: International Business Machines Corporation, Armonk, NY (US)

(72) Inventors: Jeffrey D. Amsterdam, Marietta, GA (US); Christopher E. Holladay, Marietta, GA (US); Ryan L. Whitman, Sunny Side, GA (US)

(73) Assignee: International Business Machines Corporation, Armonk, NY (US)

(*) Notice: Subject to any disclaimer, the term of this patent is extended or adjusted under 35 U.S.C. 154(b) by 45 days.

This patent is subject to a terminal disclaimer.

(21) Appl. No.: 16/051,662

(22) Filed: Aug. 1, 2018

(65) Prior Publication Data
US 2018/0343293 A1 Nov. 29, 2018

Related U.S. Application Data

(63) Continuation of application No. 15/637,122, filed on Jun. 29, 2017, now Pat. No. 10,122,779, which is a
(Continued)

(51) Int. Cl.
*H04L 29/06* (2006.01)
*H04N 21/422* (2011.01)
(Continued)

(52) U.S. Cl.
CPC .......... *H04L 65/601* (2013.01); *H04L 65/607* (2013.01); *H04N 21/23424* (2013.01);
(Continued)

(58) Field of Classification Search
CPC ................ H04L 65/601; H04L 65/607; H04N 21/23424; H04N 21/42202; H04N 21/44016; H04N 21/44218; H05K 999/99
See application file for complete search history.

(56) References Cited

U.S. PATENT DOCUMENTS 6,060,997 A    5/2000  Taubenheim et al.
6,415,326 B1*  7/2002  Gupta .............. H04N 7/17336
                                        348/E7.073
(Continued)

FOREIGN PATENT DOCUMENTS

EP     1146722      10/2001
JP     2002142209    5/2002
(Continued)

OTHER PUBLICATIONS

Notice of Allowance (dated Mar. 22, 2010) for U.S. Appl. No. 12/046,486, filed Mar. 12, 2008; Art Unit 2455; Confirmation No. 1231.
(Continued)

*Primary Examiner* — Wing F Chan
*Assistant Examiner* — Billy H Ng
(74) *Attorney, Agent, or Firm* — Schmeiser, Olsen & Watts, LLP; Michael Petrocelli

(57) ABSTRACT

A method and system for switching media streams of a video. A first media stream of the video is played in a SHOW mode in a client system as the first media stream is received. Aa switch is made from playing the first media stream to playing a second media stream of the video in the SHOW mode as the second media stream is being received. The switch preserves video content continuity of the video and includes pausing play of the first media stream. A pausing rank is associated with each timecode in the first and second media streams. The pausing occurs at a timecode in the first media stream at which the associated pausing rank is not less than a predesignated threshold.

20 Claims, 7 Drawing Sheets

Related U.S. Application Data continuation of application No. 14/285,740, filed on May 23, 2014, now Pat. No. 9,729,600, which is a continuation of application No. 13/529,130, filed on Jun. 21, 2012, now Pat. No. 8,812,716, which is a continuation of application No. 12/846,867, filed on Jul. 30, 2010, now Pat. No. 8,234,396, which is a continuation of application No. 12/046,486, filed on Mar. 12, 2008, now Pat. No. 7,774,488.

(51) Int. Cl.
*H04N 21/44* (2011.01)
*H04N 21/442* (2011.01)
*H04N 21/234* (2011.01)

(52) U.S. Cl.
CPC . *H04N 21/42202* (2013.01); *H04N 21/44016* (2013.01); *H04N 21/44218* (2013.01); *H05K 999/99* (2013.01)

(56) References Cited

U.S. PATENT DOCUMENTS

| | | | |
|---|---|---|---|
| 6,735,633 B1 | 5/2004 | Welch et al. | |
| 6,876,668 B1 | 4/2005 | Chawla et al. | |
| 6,910,078 B1 | 6/2005 | Raman et al. | |
| 7,173,911 B1 | 2/2007 | Sarkar et al. | |
| 7,254,605 B1 | 8/2007 | Strum | |
| 7,257,641 B1 | 8/2007 | VanBuskirk et al. | |
| 7,292,546 B2 | 11/2007 | Moldestad et al. | |
| 7,430,222 B2 | 9/2008 | Green et al. | |
| 7,774,488 B2 | 8/2010 | Amsterdam et al. | |
| 8,234,396 B2 | 7/2012 | Amsterdam et al. | |
| 8,812,716 B2 | 8/2014 | Amsterdam et al. | |
| 9,729,600 B2 | 8/2017 | Amsterdam et al. | |
| 2002/0133247 A1 | 9/2002 | Smith et al. | |
| 2003/0052911 A1 | 3/2003 | Cohen-solal | |
| 2003/0055995 A1* | 3/2003 | Ala-Honkola ... | H04N 21/23406 709/231 |
| 2003/0061371 A1 | 3/2003 | Deshpande | |
| 2003/0163520 A1 | 8/2003 | Bussani et al. | |
| 2003/0165136 A1 | 9/2003 | Cornelius et al. | |
| 2004/0025186 A1 | 2/2004 | Jennings et al. | |
| 2004/0172478 A1 | 9/2004 | Jacobs et al. | |
| 2005/0021804 A1 | 1/2005 | Hameleers et al. | |
| 2005/0120128 A1 | 6/2005 | Willes et al. | |
| 2005/0172028 A1 | 8/2005 | Nilsson et al. | |
| 2005/0237931 A1 | 10/2005 | Punj et al. | |
| 2006/0034583 A1* | 2/2006 | Shimizu ............... | G09B 5/065 386/353 |
| 2006/0212147 A1 | 9/2006 | McGrath et al. | |
| 2007/0005791 A1 | 1/2007 | Goulden et al. | |
| 2008/0028093 A1 | 1/2008 | Pickens et al. | |
| 2008/0146153 A1 | 6/2008 | Grosspietsch et al. | |
| 2008/0155055 A1 | 6/2008 | Shan et al. | |
| 2008/0193102 A1* | 8/2008 | Tischer ............... | H04N 5/783 386/287 |
| 2009/0103739 A1 | 4/2009 | Strait et al. | |
| 2009/0150943 A1 | 6/2009 | Vasudevan et al. | |
| 2009/0234938 A1 | 9/2009 | Amsterdam et al. | |
| 2010/0299445 A1 | 11/2010 | Amsterdam et al. | |
| 2017/0302715 A1 | 10/2017 | Amsterdam et al. | |

FOREIGN PATENT DOCUMENTS

| | | |
|---|---|---|
| JP | 2007214985 | 8/2007 |
| WO | 2007142564 | 12/2007 |

OTHER PUBLICATIONS

Notice of Allowance (dated Mar. 26, 2012) for U.S. Appl. No. 12/846,867, filed Jul. 30, 2010; Art Unit 2466; Confirmation No. 2775.
Office Action (dated Oct. 29, 2013) for U.S. Appl. No. 13/520,102, filed Jun. 21, 2012, Conf. No. 1077.
Response (filed Jan. 27, 2014) for U.S. Appl. No. 13/520,102, filed Jun. 21, 2012, Conf. No. 1077.
Notice of Allowance (dated Mar. 4, 2014) for U.S. Appl. No. 13/529,102, filed Jun. 21, 2012, Conf. No. 1077.
Office Action (dated Oct. 29, 2013) for U.S. Appl. No. 13/529,102, filed Jun. 21, 2012, First Named Inventor Jeffrey David Amsterdam, Art Unit 3441, Confirmation No. 1077.
Office Action (dated Nov. 29, 2013) for Application No. 13/529,130, filed Jun. 21, 2012, Conf. No. 7974.
Response (filed Feb. 26, 2014) for U.S. Appl. No. 13/529,130, filed Jun. 21, 2012, Conf. No. 7974.
Notice of Allowance (dated Apr. 9, 2014) for U.S. Appl. No. 13/529,130, filed Jun. 21, 2012, Conf. No. 7974
Office Action (dated Nov. 28, 2016) for U.S. Appl. No. 14/285,740, filed May 23, 2014.
Amendment (dated Feb. 27, 2017) for U.S. Appl. No. 14/285,740, filed May 23, 2014.
Notice of Allowance (dated Apr. 4, 2017) for U.S. Appl. No. 14/285,740, filed May 23, 2014.
Office Action (dated Feb. 21, 2018) for U.S. Appl. No. 15/637,122, filed Jun. 29, 2017.
Amendment (dated May 21, 2018) for U.S. Appl. No. 15/637,122, filed Jun. 29, 2017.
Notice of Allowance (dated Jun. 27, 2018) for U.S. Appl. No. 15/637,122, filed Jun. 29, 2017.

* cited by examiner

SWITCHING MEDIA STREAMS IN A CLIENT

This application is a continuation application claiming priority to Ser. No. 15/637,122, filed Jun. 29, 2017, which is a continuation of Ser. No. 14/285,740, filed May 23, 2014, U.S. Pat. No. 9,729,600, issued Aug. 8, 2017, which is a continuation of Ser. No. 13/529,130, filed Jun. 21, 2012, U.S. Pat. No. 8,812,716, issued Aug. 19, 2014, is a continuation application to Ser. No. 12/846,867, filed Jul. 30, 2010, U.S. Pat. No. 8,234,396, issued Jul. 31, 2012, which is a continuation of Ser. No. 12/046,486, filed Mar. 12, 2008, U.S. Pat. No. 7,774,488, issued Aug. 10, 2010.

FIELD OF THE INVENTION

The present invention discloses a method and system for switching video streams of a video in a client system.

BACKGROUND OF THE INVENTION

In current practice, as content providers seek to provide more high-quality video to users over the Internet, the content providers quickly find that high bandwidth live streams distributed to many simultaneous users can lead to very high bandwidth cost. There are a number of different solutions to limit the bandwidth usage of multiple high-quality streams that are currently in use. However, each of these solutions has drawbacks. One popular method is to provide a "waiting room" where users basically have to wait their turn to see the video. A drawback to this method is that it limits the number of users who can see the video at once and reduces the overall user experience. Another method is to ask the users if they are still watching the video after a set timeout period and disconnect the users who do not respond. This again degrades the user experience by popping up messages to the user.

There is a need for a method and system that overcomes or mitigates the aforementioned shortcomings of current practice of providing video to users.

SUMMARY OF THE INVENTION

The present invention provides a method for switching media streams of a video in a client system, said media streams being made available to the client system by a content providing system, said method comprising:

receiving a first media stream of the video from the content providing system;

playing the first media stream in a SHOW mode in the client system as the first media stream is being received;

during said playing the first media stream, detecting an environmental change in an environment within or adjacent to the client system, said environmental change configured to activate executing a procedure for deciding whether to make a switch from playing the first media stream to playing a second media stream of the video, said second media stream differing from the first media stream with respect to a differentiating characteristic selected from the group consisting of a content modality, a color scheme, and a media stream bandwidth;

responsive to said detecting the environmental change, executing the procedure;

deciding from said executing the procedure to make the switch; and after said deciding, switching from playing the first media stream to playing the second media stream in the SHOW mode as the second media stream is being received from the content providing system in response having been requested from the content providing system, said switching preserving video content continuity of the video, wherein said receiving the first media stream, said playing the first media stream, said detecting the environmental change, said executing the procedure, said deciding, and said switching are performed by a media application in the client system.

The present invention provides a process for supporting computer infrastructure, said process comprising providing at least one support service for at least one of creating, integrating, hosting, maintaining, and deploying computer-readable code in a computing system, wherein the code in combination with the computing system is configured to perform a method for switching media streams of a video in a client system comprised by the computing system, said media streams being made available to the client system by a content providing system, said method comprising:

receiving a first media stream of the video from the content providing system;

playing the first media stream in a SHOW mode in the client system as the first media stream is being received;

during said playing the first media stream, detecting an environmental change in an environment within or adjacent to the client system, said environmental change configured to activate executing a procedure for deciding whether to make a switch from playing the first media stream to playing a second media stream of the video, said second media stream differing from the first media stream with respect to a differentiating characteristic selected from the group consisting of a content modality, a color scheme, and a media stream bandwidth;

responsive to said detecting the environmental change, executing procedure;

deciding from said executing the procedure to make the switch; and after said deciding, switching from playing the first media stream to playing the second media stream in the SHOW mode as the second media stream is being received from the content providing system in response having been requested from the content providing system, said switching preserving video content continuity of the video, wherein said receiving the first media stream, said playing the first media stream, said detecting the environmental change, said executing the procedure said deciding, and said switching are performed by a media application in the client system.

The present invention provides a computer program product, comprising a computer usable storage medium having a computerdable program code stored therein, said computer readable program code containing instructions that when executed by a processor of a computer system implement a method for switching media streams of a video in a client system comprised by the computer system, said media streams being made available to the client system by a content providing system, said method comprising:

receiving a first media stream of the video from the content providing system;

playing the first media stream in a SHOW mode in the client system as the first media stream is being received;

during said playing the first media stream, detecting an environmental change in an environment within or adjacent to the client system, said environmental change configured to activate executing a procedure for deciding whether to make a switch from playing the first media stream to playing a second media stream of the video, said second media stream differing from the first media stream with respect to a differentiating characteristic selected from the group consisting of a content modality, a color scheme, and a media stream bandwidth;

responsive to said detecting the environmental change, executing the procedure;

deciding from said executing the procedure to make the switch; and after said deciding, switching from playing the first media stream to playing the second media stream in the SHOW mode as the second media stream is being received from the content providing system in response having been requested from the content providing system, said switching preserving video content continuity of the video, wherein said receiving the first media stream, said playing the first media stream, said detecting the environmental change, said executing the procedure, said deciding, and said switching are performed by a media application in the client system.

The present invention provides a computer system comprising a processor and a computer readable memory unit coupled to the processor, said memory unit containing instructions that when executed by the processor implement a method for switching media streams of a video in a client system comprised by the computing system, said media streams being made available to the client system by a content providing system, said method comprising:

receiving a first media stream of the video from the content providing system;

playing the first media stream in a SHOW mode in the client system as the first media stream is being received;

during said playing the first media stream, detecting an environmental change in an environment within or adjacent to the client system, said environmental change configured to activate executing a procedure for deciding whether to make a switch from playing the first media stream to playing a second media stream of the video, said second media stream differing from the first media stream with respect to a differentiating characteristic selected from the group consisting of a content modality, a color scheme, and a media stream bandwidth;

responsive to said detecting the environmental change, executing the procedure;

deciding from said executing the procedure to make the switch; and after said deciding, switching from playing the first media stream to playing the second media stream in the SHOW mode as the second media stream is being received from the content providing system in response having been requested from the content providing system, said switching preserving video content continuity of the video, wherein said receiving the first media stream, said playing the first media stream, said detecting the environmental change, said executing the procedure, said deciding, and said switching are performed by a media application in the client system.

The present invention provides a method and system that overcomes or mitigates shortcomings of current practice of providing video to users.

DETAILED DESCRIPTION OF THE INVENTION

A "video" includes a time-ordered sequence of images which may appear in frames. A video may also comprise audio content synchronized with its included images. Thus a video comprises image content alone or both image content and audio content. A "media stream" associated with a video is a signal being streamed along a transmission path, wherein the signal comprises content from the video in accordance with a content modality. For a video having both image content and audio content, its associated media stream may be in one of several content modalities: an image-audio modality if the media stream comprises both the image content and audio content of the video; an image-audio modality if the media stream comprises the image content but not the audio content of the video; or audio-only modality if the media stream comprises the audio content but not the image content of the video. For a video having image content but no audio content, its associated media stream must be in an image-only modality.

A "video source" generates or otherwise provides a video. A media stream associated with a video may originate from a video source and be ultimately delivered to a user system which presents the content of the media stream to a user, enabling the user to experience the video visually and/or audibly depending on the content modality (i.e., image-audio modality, image-only modality, or audio-only modality) of the associated media stream.

A media stream is characterized by a "bandwidth" denoting a maximum rate at which the data in the media stream can be transmitted (e.g., in units of bits per second or bytes per second) over its transmission path.

Figure 1:
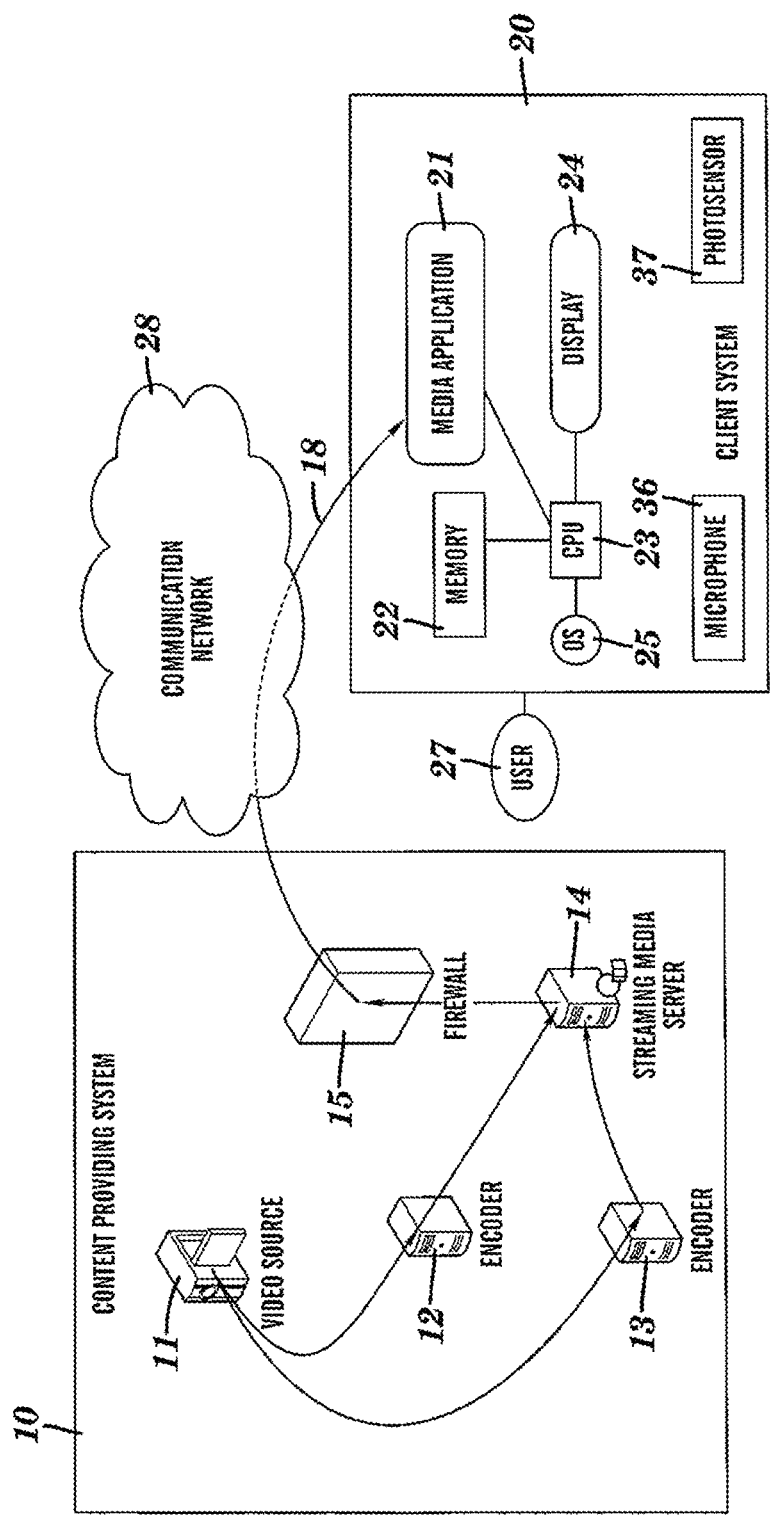
FIG. 1 depicts a client system receiving video from a content provider system via a communication network, in accordance with embodiments of the present invention.

FIG. 1 depicts a client system 20 receiving video from a content provider system 10 via a communication network 28, in accordance with embodiments of the present invention. In one embodiment, the communication network 28 is the Internet.

The content provider system 10 comprises a video source 11, an encoder 12, an encoder 13, a streaming media server 14, and a firewall 15. The encoders 12 and 13 each encode the content of the media stream by techniques known in the art that include, inter alia, image compression and audio compression. Although the content provider system 20 depicts only encoders 12 and 13, the content provider system 20 generally comprise a plurality of encoders which encode media streams having differentiating characteristics which differentiate media streams from each other. For example, the encoder 12 and encoder 13 may each encode media streams of different content modality (i.e., the image-audio modality, the image-only modality, and the audio-only modality).

Video is provided by the video source 11 and an associated video stream is passed into an encoder (e.g., encoder 12 or encoder 13) and passes out of the encoder, into the streaming media server 14, through the firewall 15 and into the client system 20 via the communication network 28. This resultant video stream 18 is received by the client system 20. Although the content provider system 10 is depicted in FIG. 1 with the streaming media server 14 therein for providing streaming image content, or streaming image and audio content, to the client system 20, in one embodiment the streaming media server 14 is not present in content provider system 10. Although the content provider system 10 is depicted in FIG. 1 with the firewall 15 therein for protecting against illegal unauthorized access and/or interception of the video stream provided by the video source 11, in one embodiment the firewall 15 is not present in the content provider system 10.

The client system 20 comprises a media application 21, a display 24, a processor 23 (e.g., a central processing unit (CPU)), a memory 22, an operating system 25, a microphone 36, and a photosensor 37. The processor 23 is coupled to the media application 21, the display 24, the processor 23, and the memory 22. The media application 21 processes the media stream 18 and displays the media stream 18 to a user of the client machine 20 on the display 24. The client system 20 may be a computer system in a form of a data processing system, a television system, etc. The client system is configured to have a user 29 view and/or hear the video and/or audio of the media stream 18.

A process of switching media streams begins with the media application 21 loading a configuration file in the memory 22. The configuration file designates a specific default media stream to be initially played in a SHOW mode on the display 24. The configuration file also designates video stream to switch to based on a detected environmental change in an environment within or adjacent to the client system. A SHOW mode is defined as a mode in which all visual and audio attributes of the media stream being played are presented to the user 29 at the client system 20. Then the media application 21 checks for the environmental change which may trigger the client system 20 to switch to a new media stream. Switching media streams of a video in accordance with embodiments of the present invention enables video to be provided to the user system 20 in an efficient manner that is convenient for a user of the client system 20.

Once the media application 21 detects the environmental change and decides to switch video streams based on the environmental change, the media application 21 initiates a loading of the new video stream in a HIDE mode. A HIDE mode is defined as a mode in which the video stream that is being played in the client system 20 is muted and visually unavailable to the user 29 at the client system 20.

The new media stream to be switched from the default video stream may be predesignated as a function of the environmental change and identified in the configuration file or elsewhere in the memory 22. Timecodes distributed in each media stream identify relative time along the timeline of each media stream. Thus, timecodes with equal values in both media streams identify the same relative time in the timeline of the media stream being played, or equivalently the same frame in the frames comprises by the video.

After the new stream has begun playing in the HIDE mode, the media application 21 begins to check the timecodes distributed in both media streams until the media application 21 finds a timecodes in the new media stream being played in the HIDE mode that matches (within a specified tolerance timecode of the current media stream e.g., default media stream) being played in the SHOW mode. Once this snatching timecode is found, the media application 21 stops the current media stream and switches the new media stream into the SHOW mode, which unmutes and makes the new media stream visible and audible to the user 29.

If the media application 21 is not able to locate a matching timecode (within a specified tolerance) and within a specified time period, the media application 21 may pause the current media stream until the media application 21 finds a new stream timecode matching the paused stream timecode. The media application 21 may then continue by switching to the new media stream from the HIDE mode to the SHOW mode. In this embodiment, the user 29 would experience a pause in the video steam being played in the SHOW mode, similar to a buffering event. However, the user 29 would not experience any loss of content continuity in the video.

Figure 2:
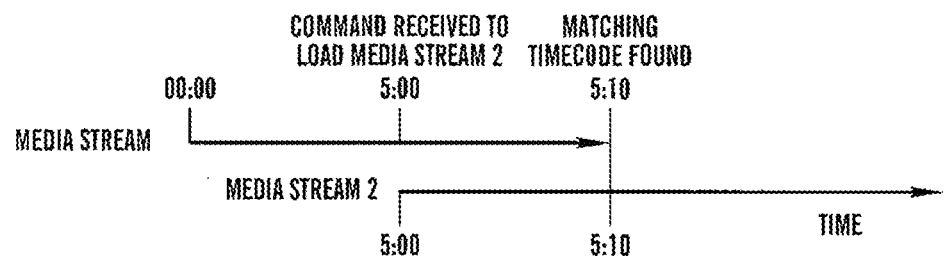
FIGS. 2 and 3 depict media stream switching scenarios, in accordance with embodiments of the present invention.
Figure 3:
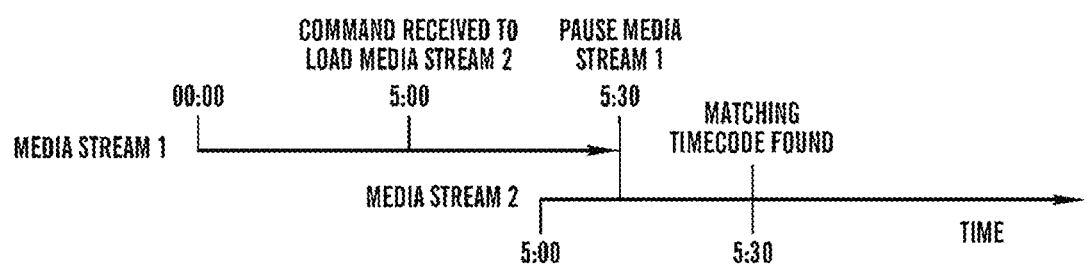

FIGS. 2 and 3 depict media stream switching scenarios, in accordance with embodiments of the present invention.

In FIG. 2, media stream 1 is playing in the SHOW mode and the media application 21 receives a command to switch media streams at a 5 minute timecode mark within the streams. The media application 21 then starts playing media stream 2 in the HIDE mode. Once media stream 2 has finished buffering and started playing, the media application 21 begins to check the timecodes in media streams 1 and 2. The media application 21 finds matching timecodes at 5 minutes 10 seconds at which time media application 21 makes media stream 2 visible and unmuted by switching media stream 2 into the SHOW mode and also stops the playing of media stream 1.

In FIG. 3, the timecodes for media stream 2 are behind the timecodes for media stream 1, which means that media stream 2 is lagging the media stream 1 with respect to their respective content. In this situation, the media application 21 pauses media stream 1 until stream 2 catches up and matching timecodes are found at 5 minutes 30 seconds.

Figure 4:
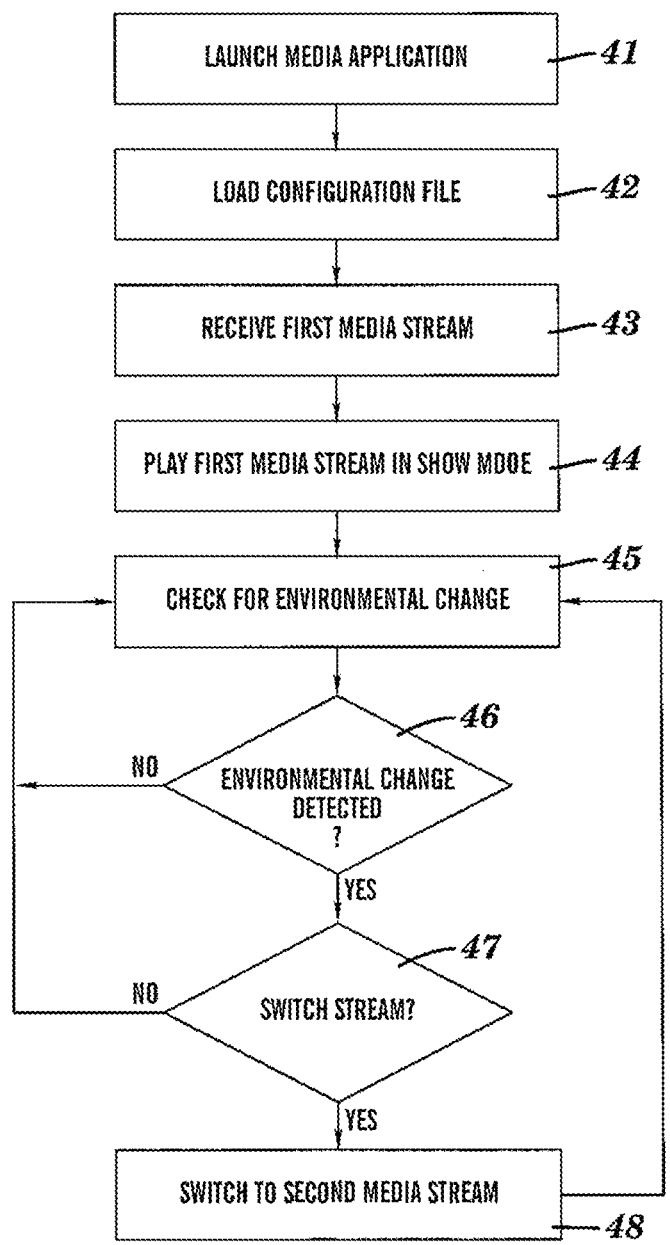
FIG. 4 is a flow chart depicting a method for switching media streams of a video in a client system, in accordance with embodiments of the present invention.

FIG. 4 is a flow chart depicting a method for switching media streams of a video in the client system 20, in accordance with embodiments of the present invention. The media streams are made available to the client system 20 by the content providing system 10. The method of FIG. 4 is performed by the media application 21 of the client system 20 in steps 41-48.

Step 41 launches the media application 21 in the client system 20.

Step 42 loads into the memory 22 a configuration file that designates a specific media stream to be initially played in the client system 20 as a default media stream, which is denoted as a first media stream.

Step 43 receives the first media stream from the content providing system 10.

Step 44 plays the first media stream in the SHOW mode via the display 24.

Step 45 checks for an environmental change that triggers execution of a procedure that decides whether to make a switch from playing the first video stream to playing a second video stream of the video, wherein the second video stream differs from the first video stream with respect to a differentiating characteristic. The environmental change may be, inter alia, a screen saver of the client system 20 in use, a change in a sound level adjacent to the client system 20 that exceeds a pre-specified change in sound level, a change in lighting level adjacent to the client system 20 that exceeds a pre-specified change in lighting level, and a hardware overload in the client system 20. The differentiating characteristic may be, inter alia, a content modality (defined supra), a color scheme, or a media stream bandwidth. A color scheme is a color shading designation, such as inter alia: shades of a single color, shades of a plurality of colors, black-and-white, shades of gray, etc. of the images in the media stream.

Step 46 determines whether the environmental change has been detected. If step 46 determines that the environmental change has not been detected, then the method loops back to step 45 to continue checking for an environmental change; otherwise the environmental change has been detected and step 47 is next performed.

Step 47 performs execution of a procedure for deciding whether to make the switch from playing the first media stream to playing the second media stream. The execution of step 47 is described in more detail in FIG. 5, discussed infra. If the procedure performed by step 47 decides not to make the switch, then the method loops back to step 45 to check for another environmental change; otherwise step 48 is next performed.

Step 48 switches from playing the first media stream in the SHOW mode to playing the second media stream in the SHOW mode as the media stream is being received from the content providing system 10, in response to the second media stream having been requested from the content providing system 10 by the client system 20. The switching preserves content continuity, which means that there is essentially no omission of content of the video displayed in the SHOW mode as a result of the switching. In one embodiment, the switching is performed seamlessly in time in a manner that preserves time continuity of presenting the video to the user 29 in the SHOW mode, as in the example of FIG. 2 described supra. In one embodiment, the switching is performed with a pause in time in the playing of the video in the SHOW mode, as in the example of FIG. 3 described supra. The execution of step 48 is described infra in more detail in FIGS. 6 and 7 in accordance with the examples of FIGS. 2 and 3 respectively.

After step 48 is executed, the method loops back to step 45 to check for another environmental change which may result in switching to a next new media stream, wherein the prior second media stream is now designated as the first media stream with respect to subsequent execution of steps 45-48, and the next new media stream to be switched to is designated as the second media stream with respect to subsequent execution of steps 45-48.

Figure 5:
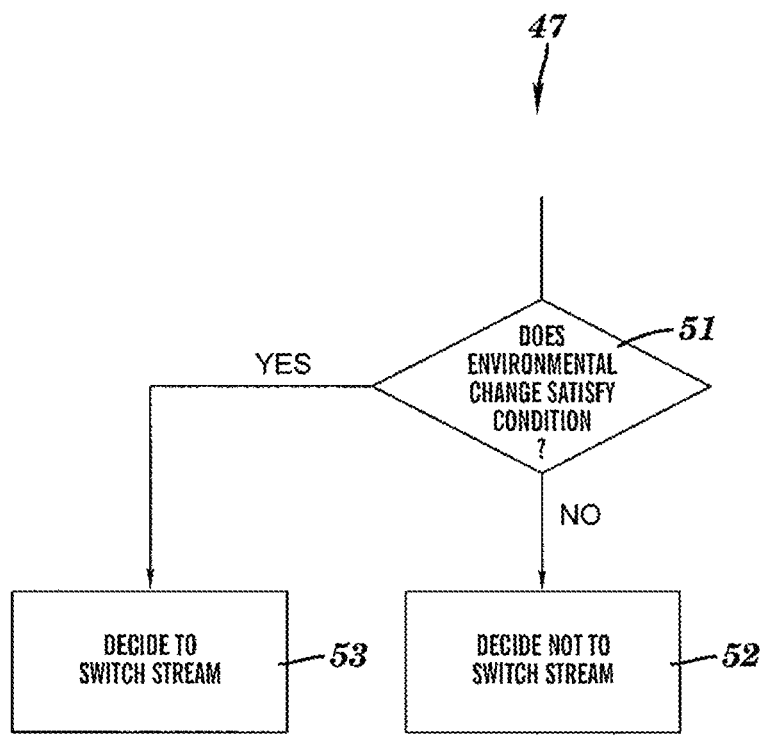
FIG. 5 is a flow chart depicting a procedure for a step in FIG. 4 of deciding whether to make a media stream switch, in accordance with embodiments of the present invention.

FIG. 5 is a flow chart depicting a procedure for step 47 in FIG. 4 of deciding whether to make the switch from playing the first media stream to playing the second media stream, in accordance with embodiments of the present invention. The flow chart of FIG. 5 comprises steps 51-53.

Step 51 determines whether the detected environmental change satisfies a pre-specified condition for switching media streams.

If step 51 determines that the detected environmental change satisfies the pre-specified condition, then step 53 is next executed and decides to switch streams; otherwise step 52 is next executed and decides to not switch streams.

In one embodiment, the detected environmental change is a screen saver of the client in use in the client system 20. The pre-specified condition is that the screen saver has been in use for at least a pre-specified period of time. The differentiating characteristic is the content modality such that the first media stream comprises an image-audio modality and the second media stream comprises an audio-only modality. This embodiment assumes that when a screen saver is in use, the user 29 does not have a need to experience image content of the video stream.

In one embodiment, the detected environmental change is a change in a sound level adjacent to the client system 20 that exceeds a pre-specified change in sound level, as detected by the microphone 36 of the client system 20. The pre-specified condition is that a current sound level associated with the detected change in the sound level exceeds a pre-specified sound level for at least a pre-specified period of time. The differentiating characteristic is the content modality such that the first media stream comprises an image-audio modality and the first media stream comprises an image-only modality. This embodiment assumes that when the sound level is sufficiently high in relation to a comfort level of human sound reception, the user 29 does not have a need to experience audio content of the video stream.

In one embodiment, the detected environmental change is a change in lighting level adjacent to the client system 20 that exceeds a pre-specified change in lighting level, as detected by the photosensor 37 of the client system 20. The pre-specified condition is that a current lighting level associated with the detected change in the lighting level exceeds a pre-specified lighting level for at least a pre-specified period time. The differentiating characteristic is the color scheme such that the first media stream comprises a first color scheme and the second media stream comprises a second color scheme that differs from the first color scheme. The second color scheme enables the second media stream to be viewed with better visual clarity at the current lighting level than the visual clarity of the first media stream comprising the first color scheme. This embodiment attempts to tailor the color scheme to the detected lighting level in order to optimize or improve visual clarity of the media stream.

In one embodiment, the detected environmental change is a hardware overload in the client system 20 (e.g., a hardware malfunction that impact storage and/or processing of the first media stream, a current heavy use of data storage by user(s) in the that limits data storage for the first media stream, etc.) that may requires a change in media stream bandwidth in order to more efficiently process the video data. The pre-specified condition is that the hardware overload is matched to a hardware overload condition in a pre-specified list of hardware overload conditions that may be stored in the client system 20 (e.g., the memory 22). The differentiating characteristic is the media stream bandwidth which will differ in the second media stream from the media stream bandwidth in the first media stream so as to improve the efficiency of processing the video data by the client system 20 in relation to the hardware overload (i.e., the specific nature of the hardware overload is taken into account in selecting the media stream bandwidth that the second media stream should comprise).

The pre-specified conditions and associated second media streams may be stored in the client system 20 (e.g., in the memory 22). The stored second media stream(s) for each pre-specified condition may be a single second media stream or a group or class of media streams from which a specific second media stream may be selected by the user system 20. The group or class of media streams comprises a plurality of media streams. Thus in one embodiment, the user system 20 selects the second media stream from the group or class of media streams, either randomly or in accordance with a criteria that selects a best (or not the worst) second media stream from the group or class of media streams, in relation to the triggering environmental change.

Figure 6:
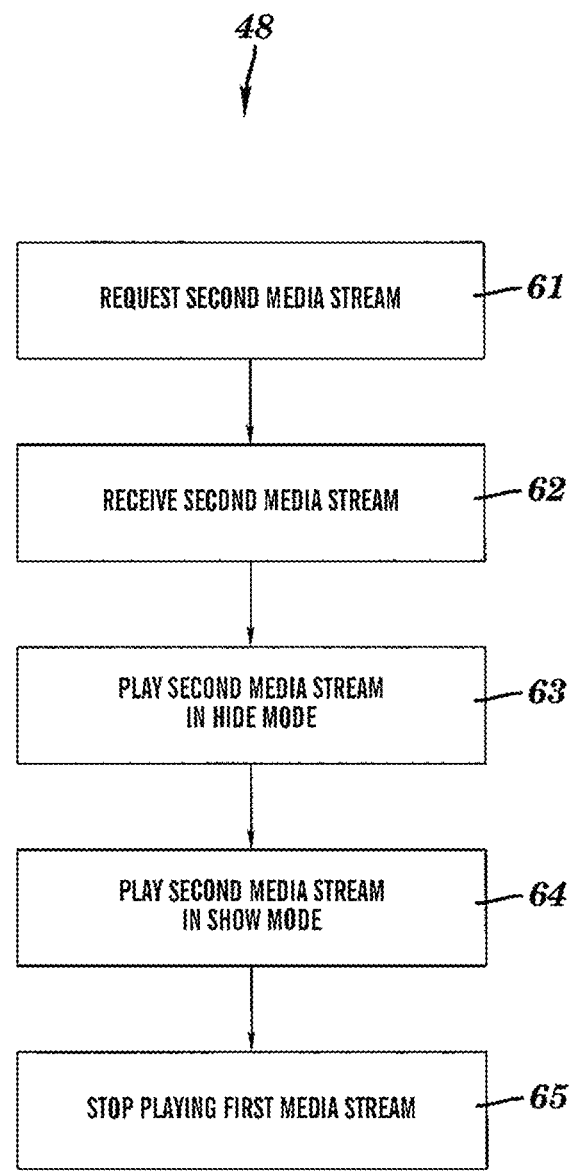
FIG. 6 is a flow chart depicting a first exemplary procedure for a step in FIG. 4 of making a media stream switch, in accordance with embodiments of the present invention.

FIG. 6 is a flow chart depicting a first exemplary procedure for step 48 in FIG. 4 of switching from playing the first media stream to playing the second media stream, in accordance with embodiments of the present invention. The flow chart of FIG. 6 is in accordance with the example depicted in FIG. 2 and comprises steps 61-65.

In step 61, the media application 21 requests a second media stream from the content providing system 10.

In step 62, the client system 20 receives the requested second media stream such that the first and second media streams are being received concurrently with respect to their respective content.

In step 63, the media application 21 plays the second media stream in the HIDE mode while the second media stream is being received and while the first media stream continues to be played in the SHOW mode.

In step 64, at a subsequent real time corresponding to a matching timecode (within a specified tolerance) in the first and second media stream, a transition is implemented from playing the second media stream in the HIDE mode to playing the second media stream in the SHOW mode.

In step 65, playing the first media stream is stopped, about simultaneous with performance of step 64 of initiating playing the second media stream in the SHOW mode.

Figure 7:
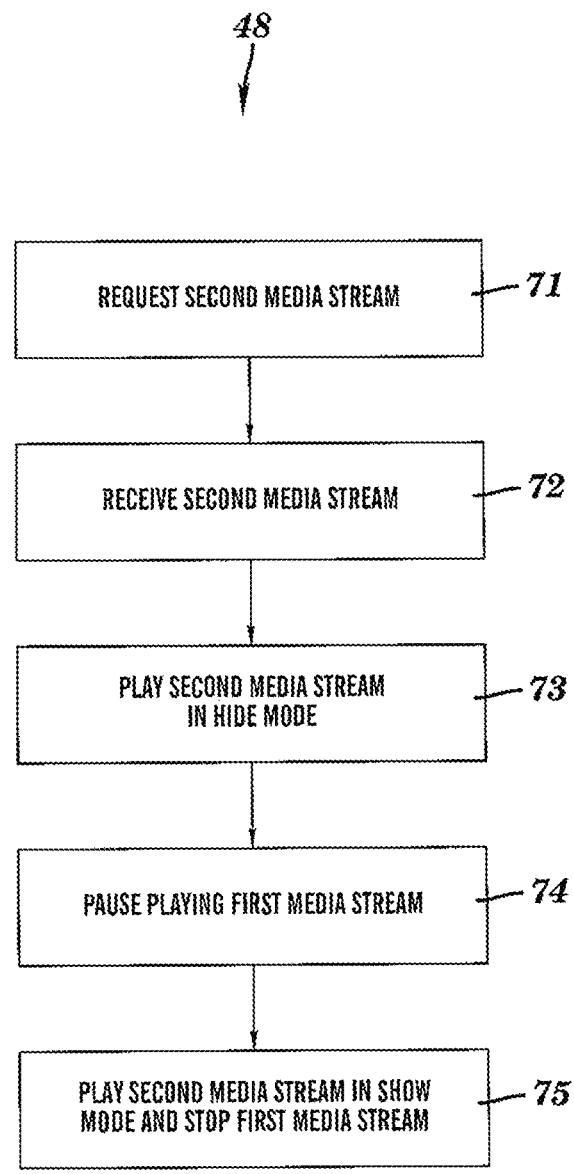
FIG. 7 is a flow chart depicting a second exemplary procedure for a step in FIG. 4 of making a media stream switch, in accordance with embodiments of the present invention.

FIG. 7 is a flow chart depicting a second exemplary procedure for step 48 in FIG. 4 of switching from playing the first media stream to playing the second media stream, in accordance with embodiments of the present invention. The flow chart of FIG. 7 is in accordance with the example depicted in FIG. 3 and comprises steps 71-75.

In step 71, the media application 21 requests a second media stream from the content providing system 10.

In step 72, the client system 20 receives the requested second media stream such that the second media stream is lagging the first media stream with respect to their respective content.

In step 73, the media application 21 plays the second media stream in the HIDE mode while the second media stream is being received.

In step 74, playing the first media stream is paused before or during playing the second media stream in the HIDE mode in step 73. The time at which pausing is initiated may take into account a relative desirability, or lack thereof, for pausing the first media stream at different timecodes in the video. For example, if the video is of a football game and the first media stream is displaying an attempted a field goal, it would be relatively undesirable to pause the media stream when the foot of the field goal kicker makes contact with the football and it would be far more desirable to pause the first media stream about five seconds later after the outcome of the attempted field goal has been determined and communicated.

Thus in one embodiment, a pausing rank is associated with each timecode in the first and second media streams. The pausing rank denotes a relative rank to pause playing the first media stream, wherein the method comprises constraining the pausing to occur at a timecode in the first media stream at which the associated pausing rank is not less than a predesignated pausing rank threshold. For example given a predesignated pausing rank threshold of 5, if successive timecodes T1, T2, T3, T4, and T5 in the first media stream have pausing ranks of 8, 3, 5, 6, and 2, respectively, and if the second media stream can be logically paused at any timecode after T1, then the second media streams would be paused at the timecode T3 because T2=3 is less than the pausing rank threshold of 5 and T3=5 is not less than the pausing rank threshold of 5.

The pausing rank associated with each timecode may be recorded as data stored in the memory 22 and/or be embedded with the media streams.

In step 75, after having paused the first media stream in step 74 and at a real time corresponding to a matching timecode (within a specified tolerance) in the first and second media stream, a transition is implemented from playing the second media stream in the HIDE mode to playing the second media stream in the SHOW mode. The paused first media stream is stopped from being paused and from being played at about this real time.

Figure 8:
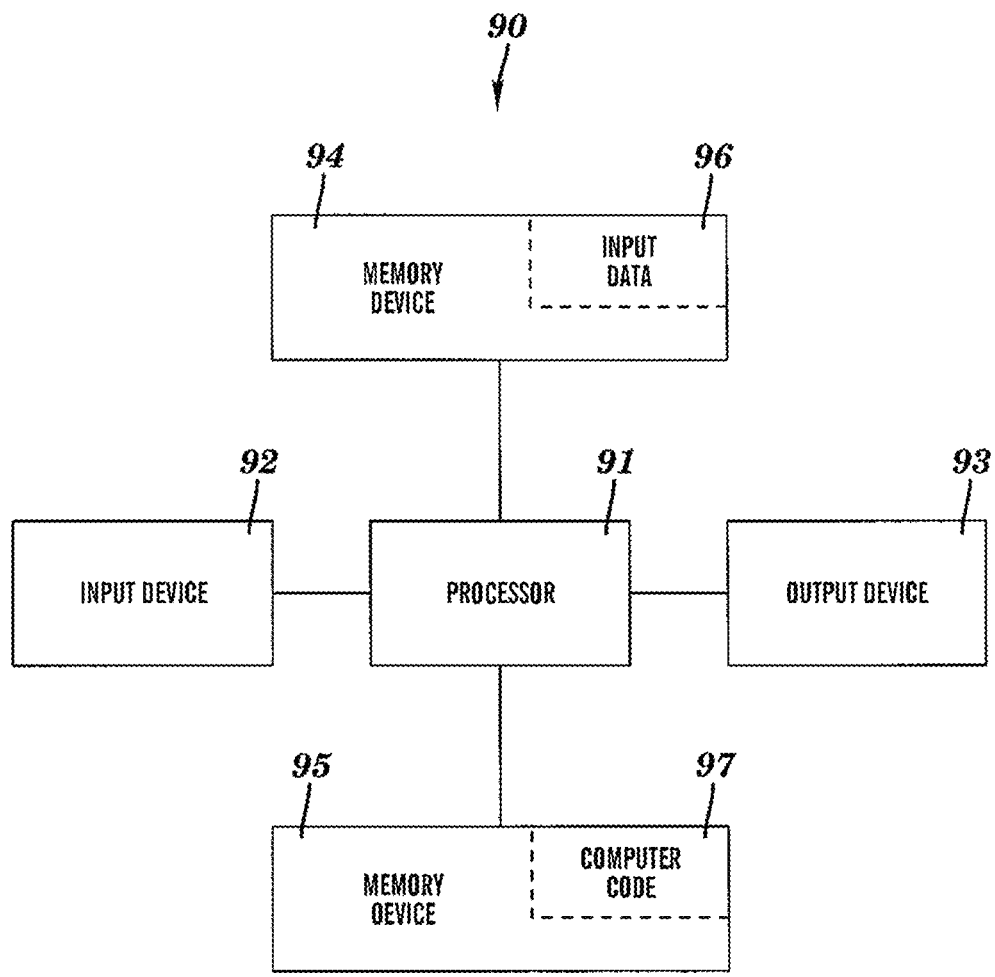
FIG. 8 illustrates a computer system used for switching media streams of a video in a client system, in accordance with embodiments of the present invention.

FIG. 8 illustrates a computer system 90 used for switching media streams of a video in a client system, in accordance with embodiments of the present invention. The computer system 90 may comprise the client system 20 of FIG. 1. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may comprise the display 24 of FIG. 1 and additionally include, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. Either or both of the memory devices 94 and 95 may comprise the memory 22 of FIG. 1. The memory device 95 includes a computer code 97 which is a computer program that comprises computer-executable instructions. The computer code 97 may comprise the media application 21 of FIG. 1 and includes an algorithm for switching media streams of a video in the client system. The processor 91 executes the computer code 97 and may represent the processor 23 of FIG. 1. The memory device 94 includes input data 96. The input data 96 includes input required by the computer code 97. The output device 93 displays output from the computer code 97. Either or both memory devices 94 and 95 (or one or more additional memory devices not shown in FIG. 8) may be used as a computer readable storage medium having a computer readable program store therein and/or having other data stored therein, wherein the computer readable program comprises the computer code 97. Generally, a computer program product (or, alternatively, an article of manufacture) of the computer system 90 may comprise said computer readable storage medium.

Thus the present invention discloses a process for supporting computer infrastructure, integrating, hosting, maintaining, and deploying computer-readable code into the computer system 90, wherein the code in combination with the computer system 90 is capable of performing a method for switching media streams of a video in a client system.

Any of the components of the present invention could be created, integrated, hosted, maintained, deployed, managed, serviced, supported, etc. by a service provider who offers to facilitate switching media streams of a video in a client system. Thus the present invention discloses a process for deploying or integrating computing infrastructure, comprising integrating computer-readable code into the computer system 90, wherein the code in combination with the computer system 90 is capable of performing a method for switching media streams of a video in a client system.

In another embodiment, the invention provides a business method that performs the process steps of the invention on a subscription, advertising, and/or fee basis. That is, a service provider, such as a Solution Integrator, could offer to facilitate switching media streams of a video in a client system. In this case, the service provider can create, integrate, host, maintain, deploy, manage, service, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

While particular embodiments of the present invention have been described herein for purposes of illustration, many odifications and changes will become apparent to those skilled in the art. Accordingly, the appended claims are intended to encompass all such modifications and changes as fall within the true spirit and scope of this invention.

What is claimed is:

1. A method for switching media streams of a video, said method comprising:
   playing, by a processor, a first media stream of the video in a SHOW mode in a client system as the first media stream is being received from a content providing system;
   said processor switching from playing the first media stream to playing a second media stream of the video in the SHOW mode as the second media stream is being received from the content providing system, said switching preserving video content continuity of the video, said second media stream differing from the first media stream with respect to a differentiating characteristic, said switching comprising pausing said playing the first media stream, wherein timecodes identifying relative time within the video are distributed in the first media stream and the second media stream, and wherein a pausing rank is associated with each timecode in the first and second media streams and denotes a relative rank to pausing said playing the first media stream; and
   said processor constraining said pausing to occur at a timecode in the first media stream at which the associated pausing rank is not less than a predesignated pausing rank threshold.

2. The method of claim 1, wherein the method further comprises:
   after said pausing and at a real time corresponding to having determined a mate timecode of said timecodes within a specified tolerance, in the first and second media stream, said processor transitioning from playing the second media stream in a HIDE mode to playing the second media stream in the SHOW mode and stopping the first media stream from being paused and being played.

3. The method of claim 2, wherein said switching comprises:
   before said transitioning, playing the second media stream in the HIDE mode in the client system while the second media stream is being received from the content providing system, wherein the second media stream is lagging the first media stream with respect to their respective content.

4. The method of claim 3, wherein said pausing occurs before or during said playing the second media stream in the HIDE mode.

5. The method of claim 1, wherein the differentiating characteristic is selected from the group consisting of a content modality, a color scheme, and a media stream bandwidth.

6. The method of claim 1, wherein the method further comprises:
   during said playing the first media stream, said processor detecting an environmental change in an environment within or adjacent to the client system,
   wherein said switching is in response to said detecting the environmental change.

7. The method of claim 6, wherein the environmental change is selected from the group consisting of a change in a screen saver of the client system in use, a change in a sound level adjacent to the client system hat exceeds a pre-specified change in sound level, a change in lighting level adjacent to the client system that exceeds a pre-specified change in lighting level, and a hardware overload in the client system.

8. A computer system, comprising a processor, a memory coupled to the processor, and a computer readable hardware storage device coupled to the processor, said storage device containing program code executable by the processor via the memory to implement a method for switching media streams of a video, said method comprising:
   said processor playing a first media stream of the video in a SHOW mode in a client system as the first media stream is being received from a content providing system;
   said processor switching from playing the first media stream to playing a second media stream of the video in the SHOW mode as the second media stream is being received from the content providing system, said switching preserving video content continuity of the video, said second media stream differing from the first media stream with respect to a differentiating characteristic, said switching comprising pausing said playing the first media stream, wherein timecodes identifying relative time within the video are distributed in the first media stream and the second media stream, and wherein a pausing rank is associated with each timecode in the first and second media streams and denotes a relative rank to pausing said playing the first media stream; and
   said processor constraining said pausing to occur at a timecode in the first media stream at which the associated pausing rank is not less than a predesignated pausing rank threshold.

9. The computer system of claim 8, wherein the method further comprises:
   after said pausing and at a real time corresponding to having determined a matching timecode of said timecodes within a specified tolerance, in the first and second media stream, said processor transitioning from playing the second media stream in a HIDE mode to playing the second media stream in the SHOW mode and stopping the first media stream from being paused and being played.

10. The computer system of claim 9, wherein said switching comprises:
    before said transitioning, playing the second media stream in the HIDE mode in the client system while the second media stream is being received from the content providing system, wherein the second media stream is lagging the first media stream with respect to their respective content.

11. The computer system of claim 10, wherein said pausing occurs before or during said playing the second media stream in the HIDE mode.

12. The computer system of claim 8, wherein the differentiating characteristic is selected from the group consisting of a content modality, a color scheme, and a media stream bandwidth.

13. The computer system of claim 8, wherein the method further comprises:
during said playing the first media stream, said processor detecting an environmental change in an environment within or adjacent to the client system,
wherein said switching is in response to said detecting the environmental change.

14. The computer system of claim 13, wherein the environmental change is selected from the group consisting of a change in a screen saver of the client system in use, a change in a sound level adjacent to the client system that exceeds a pre-specified change in sound level, a change in lighting level adjacent to the client system that exceeds a pre-specified change in lighting level and a hardware overload in the client system.

15. A computer program product, comprising a computer readable hardware storage device having computer readable program code stored therein, said program code containing instructions executable by a processor of a computer system to implement a method for switching media streams of a video, said method comprising:
said processor playing a first media stream of the video in a SHOW mode in a client system as the first media stream is being received from a content providing system;
said processor switching from playing the first media stream to playing a second media stream of the video in the SHOW mode as the second media stream is being received from the content providing system, said switching preserving video content continuity of the video, said second media stream differing from the first media stream with respect to a differentiating characteristic, said switching comprising pausing said playing the first media stream, wherein timecodes identifying relative time within the video are distributed in the first media stream and the second media stream, and wherein a pausing rank is associated with each timecode in the first and second media streams and denotes a relative rank to pausing said playing the first media stream; and
said processor constraining said pausing to occur at a timecode in the first media stream at which the associated pausing rank is not less than a predesignated pausing rank threshold.

16. The computer program product of claim 15, wherein the method further comprises:
after said pausing and at a real time corresponding to having determined a matching timecode of said timecodes within a specified tolerance, in the first and second media stream, said processor transitioning from playing the second media stream in a HIDE mode to playing the second media stream in the SHOW mode and stopping the first media stream from being paused and being played.

17. The computer program product of claim 16, wherein said switching comprises:
before said transitioning, playing the second media stream in the HIDE mode in the client system while the second media stream is being received from the content providing system, wherein the second media stream is lagging the first media stream with respect to their respective content.

18. The computer program product of claim 17, wherein said pausing occurs before or during said playing the second media stream in the HIDE mode.

19. The computer program product of claim 15, wherein the differentiating characteristic is selected from the group consisting of a content modality, a color scheme, and a media stream bandwidth.

20. The computer program product of claim 15, wherein the method further comprises:
during said playing the first media stream, said processor detecting an environmental change in an environment within or adjacent to the client system,
wherein said switching is in response to said detecting the environmental change.

* * * * *